(12) United States Patent
Nguyen et al.

(10) Patent No.: US 9,722,776 B2
(45) Date of Patent: Aug. 1, 2017

(54) HOMOMORPHIC SIGNATURES AND NETWORK CODING SIGNATURES

(75) Inventors: Duy Lan Nguyen, Newcastle, WA (US); Tolga Acar, Sammamish, WA (US); Avradip Mandal, Luxembourg (LU)

(73) Assignee: Microsoft Technology Licensing, LLC, Redmond, WA (US)

( * ) Notice: Subject to any disclaimer, the term of this patent is extended or adjusted under 35 U.S.C. 154(b) by 498 days.

(21) Appl. No.: 13/529,332

(22) Filed: Jun. 21, 2012

(65) Prior Publication Data

US 2013/0346755 A1    Dec. 26, 2013

(51) Int. Cl.
*H04L 9/00*  (2006.01)
*H04L 9/30*  (2006.01)
*H04L 9/32*  (2006.01)

(52) U.S. Cl.
CPC ............ *H04L 9/008* (2013.01); *H04L 9/3073* (2013.01); *H04L 9/3247* (2013.01)

(58) Field of Classification Search
CPC ...................................................... H04L 9/008
See application file for complete search history.

(56) References Cited

U.S. PATENT DOCUMENTS

| | | | |
|---|---|---|---|
| 7,743,253 B2* | 6/2010 | Lauter ...................... | H04L 9/008 713/170 |
| 8,667,288 B2* | 3/2014 | Yavuz ................... | H04L 9/3247 713/176 |
| 9,356,783 B2* | 5/2016 | Joye ....................... | H04L 9/0847 |
| 2012/0144459 A1* | 6/2012 | Nguyen et al. ....... | H04L 9/0891 726/5 |

OTHER PUBLICATIONS

Attrapadung et al, Homomorphic Network Coding Signatures in the Standard Model, Mar. 2011, Retrieved from the Internet URL: <perso.uclouvain.be/benoit.libert/NCS-pkc11.pdf>, pp. 1-17 as printed.*

Boneh et al, Signing a Linear Subspace: Signature Schemes for Network Coding, 2009, Retrieved from the Internet URL: <citeseerx.ist.psu.edu/viewdoc/download?doi=10.1.1.140. 2618&rep=rep1&type=pdf>, pp. 1-19 as printed.*

(Continued)

*Primary Examiner* — Saleh Najjar
*Assistant Examiner* — Simon Kanaan (57) ABSTRACT

The subject disclosure is directed towards a technology by which data is securely distributed using a homomorphic signature scheme and homomorphic network coding signature schemes. A homomorphic signature scheme for signing the data is based upon binary pairing with standard prime order groups. Sets of data are signed based upon dividing a larger block of data into smaller blocks, and separately signing each smaller block. The smaller blocks may be distributed to nodes of a network topology that are configured for network coding. In one alternative, the homomorphic signature scheme protects against changes to the block identifier. Proof data may be provided independent of a random oracle, may be provided by providing parameters for verification in a Groth-Sahai proof system, or may be provided by providing parameters for verification independent of a Groth-Sahai proof system.

20 Claims, 4 Drawing Sheets

(56) References Cited

OTHER PUBLICATIONS

Fuchsbauer, Commuting Signatures and Verifiable encryption, 2011, Retrieved from the Internet URL: <link.springer.com/content/pdf/10.1007%2F978-3-642-20465-4_14>, pp. 1-22 as printed.*
Acar et al., Homomorphic Proofs and Applications, Retrieved from the Internet URL: <research.microsoft.com/pubs/146522/rac.pdf>, pp. 1-12 as printed.*

* cited by examiner

HOMOMORPHIC SIGNATURES AND NETWORK CODING SIGNATURES

BACKGROUND

Network coding refers to data packet routing techniques that may be used instead of 'store and forward' networking techniques. In general, network coding is performed at network nodes to combine incoming packets into coded packets before transmitting those coded packets to a recipient node or nodes. The combination of data is such that each recipient node is able to recover the original data from less than all received packets. Network coding thus provides improved resilience to packet loss, and moreover, increases throughput for certain classes of network topologies.

More particularly, at each node, the outgoing packets contain vectors that are calculated as a linear combination of vectors conveyed by incoming packets. With random linear network coding, packets are combined using coefficients that each node chooses at random. A recipient node is able to recover the original data from any set (of sufficient cardinality) of linearly independent vectors and without prior knowledge of the coefficients chosen by the intermediate nodes. Linear network codes offer robustness, adaptability and thus offer benefits in many practical applications, e.g., in wireless and sensor networks.

However, network coding is highly sensitive to pollution attacks, in which malicious nodes inject corrupted packets (e.g., one or more packets outside of the linear span of received packets) into the network, which prevents the recipient node from recovering the original file. Because nodes perform linear transformation over the incoming nodes, even a single corrupted packet is likely to contaminate the entire network and eventually hinder the decoding process. Intermediate non-malicious nodes thus need a way to verify the validity of incoming packets and filter out the bad ones. Packets cannot be authenticated using traditional digital signature schemes, because the transmitted packets need to be modified by the network nodes and thus cannot be simply signed by the source. In sum, traditional digital signature schemes fail in situations where a digital signature on arbitrarily combined packets needs verification, assuming that the total cost of verifying independent signatures is costlier than verifying a single combined signature on a target node.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which data is securely distributed using a homomorphic signature scheme, in which the homomorphic signature scheme for signing the data is based upon binary pairing with standard prime order groups. In one aspect, the sets of data are signed based upon dividing a larger block of data into smaller blocks, and separately signing each smaller block. The smaller blocks may be distributed to nodes of a network topology that are configured for network coding combinations of a subset of the smaller blocks. In one alternative, each of the blocks may contain information corresponding to a block identifier, and the homomorphic signature scheme protects against changes to the block identifier.

In one aspect, proof data is provided independent of a random oracle. In one alternative, proof data is provided by providing parameters for verification in a Groth-Sahai proof system. In one alternative, proof data is provided by providing parameters for verification independent of a Groth-Sahai proof system.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a homomorphic signature scheme and homomorphic network coding signature schemes. These schemes allow for signing of packets in a way that may be used to detect corrupted packets, and thereby reduce the harm of pollution attacks.

Described herein are a homomorphic signature scheme and constructions for homomorphic network coding signature schemes. These schemes are secure in the standard model (as opposed to the Random Oracle based security of previous schemes). Additionally, these schemes do not require a special composite order pairing group, (as does the only other known scheme with security in the standard model does), thereby expanding the applicability to any pairing friendly group and making designs general to any pairing friendly group.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking/network security in general.

Figure 1:
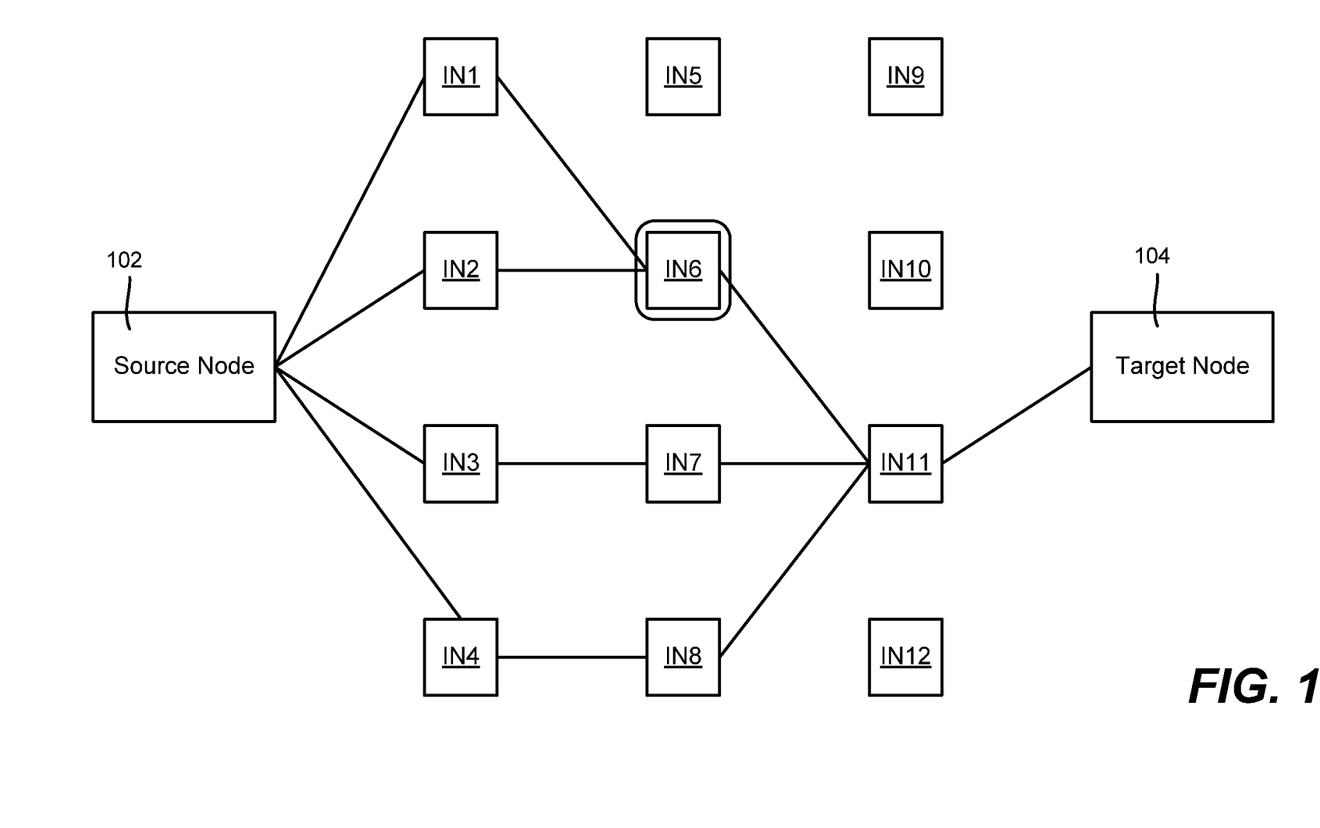
FIG. 1 is a representation of a network configured for distributing data via a network topology in which nodes are configured for network coding.

Turning to FIG. 1, a plurality of nodes that route network data is shown. As can be readily appreciated, the arrangement of the depicted nodes is only an example, and the technology described herein applies to any practical number and/or arrangement of nodes. Further, the path or paths taken by a network packet may be arbitrary, and FIG. 1 is only an example of such paths.

In FIG. 1, a source node 102, which may be any computing device capable of sending data (including a computer system, a router or the like) is sending data (e.g., a file) to one or more destination nodes, shown for simplicity in FIG. 1 as a single target node 104. The target node 104 may be any computing device capable of receiving data. Note that in an actual network there may be more than one source node using the network, and there may be more than one target node, however only one of each is shown for purposes of simplicity.

As is known, to transmit a large file or the like, the source node 102 may segment the data into smaller packages, which for purposes of the example herein are referred to as data packets. Various decisions may be made by the source node to select which node or nodes traffic is to be routed, providing a distributed system/distribution scheme.

In the example topology of FIG. 1, the source node 102 is coupled to intermediate nodes IN1-IN4 and distributes the data packets (e.g., of a file) to these intermediate nodes IN1-IN4. The intermediate nodes IN1-IN4 in turn are coupled to other intermediate nodes IN5-IN8, which in turn are coupled to other intermediate nodes IN9-IN12 that are coupled to the target node 104 in this example topology. In the example of FIG. 1, packets from the source node 102 are received at intermediate nodes IN1-IN4. The intermediate nodes IN1 and IN2 distribute their received packets to IN6, IN3 distributes its received packets to IN7, and IN4 distributes its received packets to IN8. In turn, the intermediate nodes IN6, IN7 and IN8 distribute packets to the intermediate node IN11.

Any of the packets corresponding to the same file may be coded using network coding before transmitting those coded packets to a recipient node, which helps with resilience to packet loss and can improve throughput. However, consider that in FIG. 1, the intermediate node IN6 is a malicious node (as indicated by the bordered box) that injects one or more corrupt packets into the network, which the node IN11 receives. Heretofore the intermediate node IN11 was unable to detect such packets, whereby some of the packets received at the target node 104 are thus corrupted. If as described herein such corrupted packets are detectable, they are able to be filtered out, whereby it is highly likely that the target node 104 is able to reconstruct the original data. However, traditional signature schemes cannot be used for such detection.

Described herein are a homomorphic signature scheme and constructions for homomorphic network coding signature schemes by which corrupted coded packets can be detected. As will be understood, each scheme has different characteristics that make them applicable to various scenarios. For example, one homomorphic network coding signature scheme described herein is secure in a stronger security model where the attacker can choose the data (e.g., file) identifier (in contrast to previous schemes that were not secure when the attacker can choose the data identifier). Another homomorphic network coding signature scheme is secure in a weaker security model (thus is more secure), and does not depend on the Groth-Sahai proof system, which comprises using a relatively complex and computationally-expensive set of equations.

Figure 2:
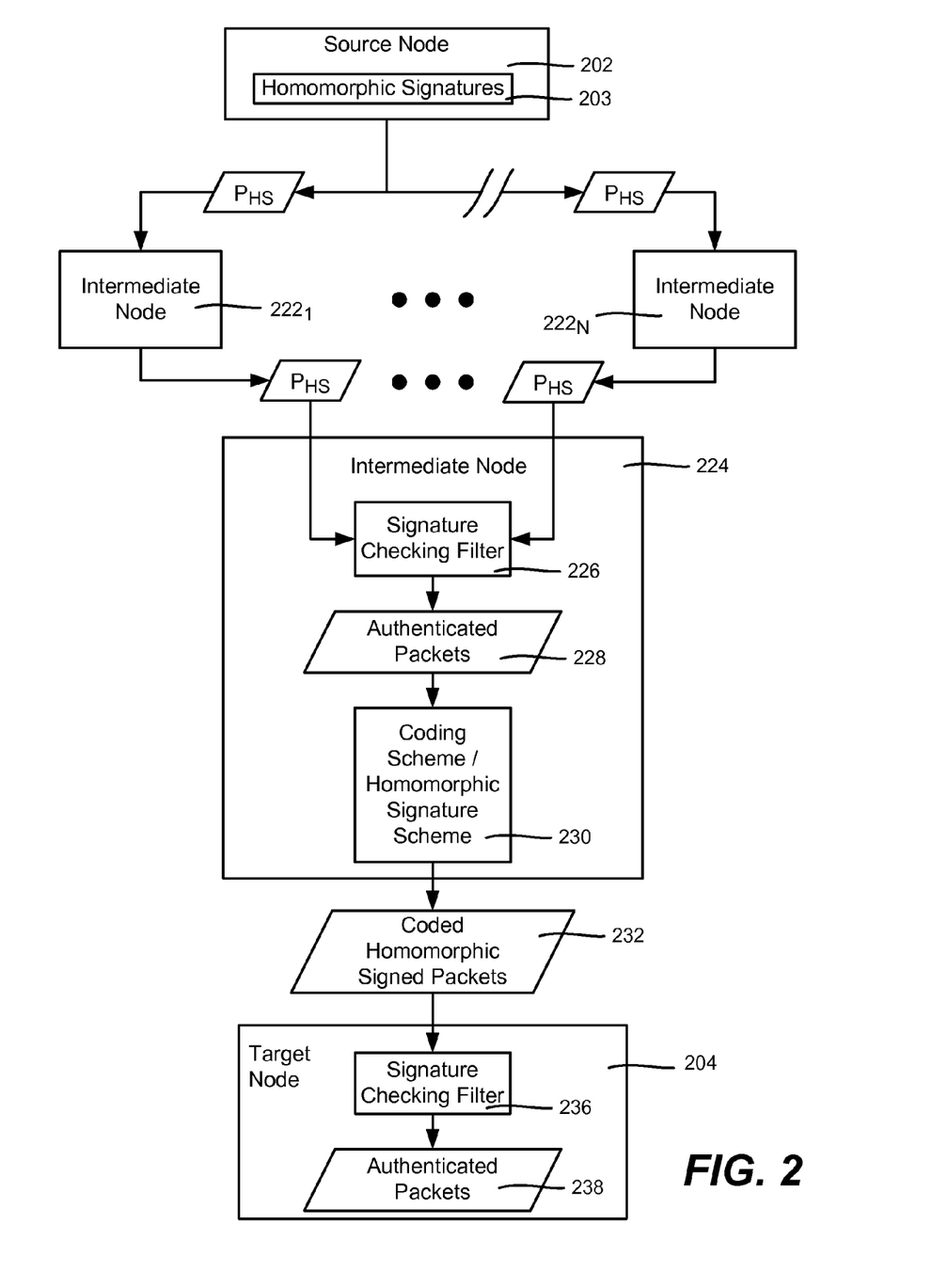
FIG. 2 is a block diagram representing how a homomorphic signature scheme as described herein may be used with network coding to verify data integrity.

FIG. 2 is an example block/dataflow diagram showing how a source node 202 distributes packets $P_{HS}$, signed using signatures 203 of a homomorphic signature scheme as described herein, to intermediate nodes $222_1$-$222_N$. The intermediate nodes may combine multiple packets, if received, digitally sign them with a homomorphic signature, and send/distribute them to other nodes. In the example of FIG. 2, at least one other intermediate node 224 receives the packets.

In FIG. 2, components of the illustrated intermediate node 224 (which are also in intermediate nodes $222_1$ and $222_N$, but not shown for simplicity) are able to use public information received with each packet to authenticate the signatures. Any non-verified packets are discarded, as represented by the signature checking filter 226. Authenticated packets 228 may be network coded/signed with a homomorphic signature scheme as represented via the block 230, resulting in coded homomorphic signed packets 232.

These coded packets, possibly along with other packets from other intermediate nodes, are received at the final destination node, shown as the target node 204. A signature checking filter 236 is used to filter out non-verified packets resulting in authenticated packets 238. The authenticated packets may be used to reconstruct the original file data.

Figure 3:
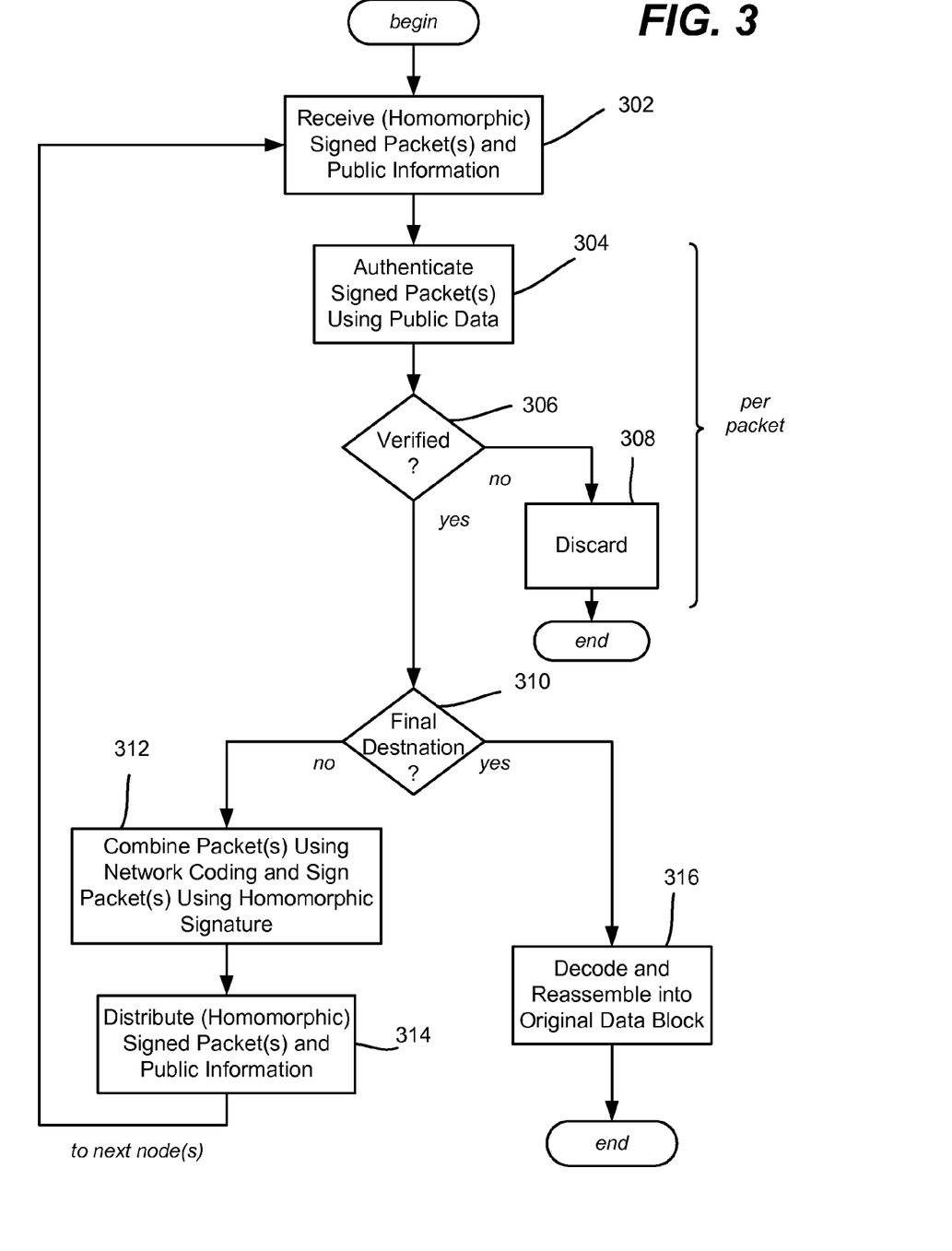
FIG. 3 is a flow diagram representing example steps that may be taken to process received data for verification and network coding using a homomorphic signature scheme as described herein.

FIG. 3 is an example flow diagram showing example steps directed towards digital signatures for network coding, that is, the distribution scheme may be a network coding distribution scheme. A source provides a set of data by dividing the data into blocks and digitally signing each block with respective homomorphic digital signatures 203 (FIG. 2). This may be accomplished as described in U.S. published patent application no. 20070118746, hereby incorporated by reference.

At step 302, a node receives one or more of the distributed linear combination of packets, including public information. At steps 304 and 306, the recipient node authenticates and verifies and content in each received packet using the public information. Any packet that is not verified may be discarded, as represented via step 308.

If the recipient node is not the final destination (target node) as represented by step 310, at step 312 the recipient node combines packets and signs them with a signature based upon the received signatures. The recipient node thus digitally re-signs the valid packets without communicating back to the previous source. The recipient node may then distribute (step 314) the re-signed, combined packets along with associated public information used to digitally sign the blocks, to a next recipient device.

At some point in a typical transmission, at step 310 a node that is the final destination will receive the packets. At step 316, these packets may then be decoded and used to reassemble the original data block (e.g., file). Note that invalid packets are discarded, and the received data is not corrupted, whereby secure network coding is provided despite malicious intermediate nodes.

One homomorphic signature scheme described herein is based on the Groth-Sahai proof system and is secure in the standard model. This scheme does not require a special composite pairing group (as with previous schemes), and instead works on any pairing group such as pairing friendly Elliptic Curve Groups.

Turning to network coding, consider a network as represented in FIG. 1 with one source node 102 and a target node 104 (or a set of target nodes). A general goal in this example is to have the source node transmit a file to the target node, where a file is represented as a matrix comprising m row vectors $\vec{v}_1, \ldots, \vec{v}_m \in \mathbb{Z}_N^k$ over a field $\mathbb{Z}_N$. Initially, the source node creates m augmented vectors $\vec{w}_1, \ldots, \vec{w}_m \in \mathbb{Z}_N^n$, with $n=k+m$, by setting $$\begin{pmatrix} \vec{w}_1 \\ \vec{w}_2 \\ \vdots \\ \vec{w}_m \end{pmatrix} = \begin{pmatrix} \vec{v}_1 & 10 \ldots 0 \\ \vec{v}_2 & 01 \ldots 0 \\ \vdots & \ddots \\ \vec{v}_m & 00 \ldots 1 \end{pmatrix}. \quad (1)$$

The source node 102 sends these augmented vectors to its neighboring nodes, shown in the example of FIG. 1 as intermediate nodes IN1-IN4. The span of row vectors of the above matrix generates a vector subspace $V \subset \mathbb{Z}_N^n$ of dimension m with basis $\vec{w}_1, \ldots, \vec{w}_m$. Note that when the basis is in the form corresponding to the right hand side of Equation (1), the basis is called a properly augmented basis.

Intermediate nodes IN1-IN4 in the network receive the vectors $\vec{y}_1, \ldots, \vec{w}_l \in \mathbb{Z}_N^n$ on its l incoming edges. Each non-malicious ("honest") intermediate node computes a new vector for each outgoing edge as a random linear combination of the vectors it received. Namely, at the $j^{th}$ outgoing edge, the vector $\vec{z}_j \in \mathbb{Z}_N^n$ has the form $\vec{z}_j = \Sigma_{i=1}^l \alpha_{i,j} \vec{y}_i$, for random coefficients $(\alpha_{1,j}, \ldots, \alpha_{l,j}) \in \mathbb{Z}_N^l$.

The target node 104 recovers the file using a set of vectors from its incoming edges. The target node 104 finds m linearly independent vectors $\{\vec{y}_i = \vec{x}_i \| \vec{u}_i\}_{i=1}^m$ where $u_1, \ldots, \vec{u}_m$ are linearly independent (here $\vec{x}_i \in \mathbb{Z}_N^k$, $u_i \in \mathbb{Z}_N^m$). The original file is then recovered as $$\begin{pmatrix} \vec{v}_1 \\ \vec{v}_2 \\ \vdots \\ \vec{v}_m \end{pmatrix} = \begin{pmatrix} \vec{u}_1 \\ \vec{u}_2 \\ \vdots \\ \vec{u}_m \end{pmatrix}^{-1} \cdot \begin{pmatrix} \vec{x}_1 \\ \vec{x}_2 \\ \vdots \\ \vec{x}_m \end{pmatrix},$$

which is computable as $\vec{u}_1, \ldots, \vec{u}_m$ are linearly independent.

The above-described network coding scheme is highly susceptible to attacks. Due to error propagation, even a single malicious ("dishonest") intermediate node (e.g., IN6, represented in FIG. 1 by the double box) can succeed in disrupting the transmission of the correct file. Traditional signature schemes by which authenticity of the data can be validated are not particularly helpful in this scenario, as honest nodes need to generate signatures for a random combination of received vectors.

A homomorphic network coding signature scheme as described herein solves this problem. With homomorphic signatures, given a set of vectors and their signatures, the signature of any vector that is spanned by the given set of vectors may be efficiently computed. However, generating a signature for any vector outside the spanned subspace is difficult. Moreover homomorphic network coding signatures ensure that intermediate nodes can only combine vectors from the same file.

Turning to one homomorphic network signature scheme, informally each vector that is signed is part of a file, which has a file identifier. For a fixed file identifier, the signatures have (or should have) the homomorphic property. However, the signatures of vectors associated with different file identifiers are not (or should not) be able to be combined.

More formally, a homomorphic network signature scheme is a tuple of efficient algorithms $\Sigma = $(Keygen, Sign, Verify, Combine) where Keygen($\lambda$, n) is a probabilistic algorithm that takes as input a security parameter $\lambda \in \mathbb{N}$ and an integer $n \in $poly($\lambda$) denoting the length of the vectors to be signed. The algorithm outputs the public key, secret key pair (pk, sk). Sign(pk, sk, $\vec{m}$, id) is a possibly randomized algorithm that takes public key, secret key pair (pk, sk), a vector $\vec{m}$ of dimension n, a file identifier id and outputs a signature $\sigma$.

Verify(pk, id, $\vec{m}$, $\sigma$) is a deterministic algorithm that takes the public key pk, a signature $\sigma$ and a vector $\vec{m}$. This algorithm outputs Accept or Reject. Combine(pk, $\{(\beta_i, \sigma_i)\}_{i=1}^l$) is a possibly randomized algorithm that takes as input the public key pk, and l signatures $\sigma_i$ with corresponding weight $\beta_i$. The output is a signature $\sigma$ on the vector $\vec{y} = \Sigma_{i=1}^l \beta_i \vec{v}_i$, where $\sigma_i$ is a signature on $\vec{v}_i$. The vectors $\vec{v}_i$ and the combined vector $\vec{y}$ shares a common file identifier id.

With respect to correctness, for the security parameters $\lambda \in \mathbb{N}$, all integers $n \in $poly($\lambda$) and all tuples (pk, sk)$\leftarrow$Keygen($\lambda$, n), the following holds.

1. For any n-vector $\vec{m}$, and file identifier id if $\sigma \leftarrow$Sign(pk, sk, id, $\vec{m}$) then Verify(pk, id, $\vec{m}$, $\sigma$)$\rightarrow$Accept.

2. Suppose $\sigma_i$'s are valid signatures for vectors $\vec{m}_i$'s with file identifier id (in other words Verify(pk, id, $\vec{m}_i$, $\sigma_i$)$\rightarrow$Accept) for i=1, ..., l. Then, for any set of scalars $\beta_1, \ldots, \beta_l$, Verify(pk, id, $\vec{y}$, $\sigma$)$\rightarrow$Accept where Combine(pk, $\{(\beta_i, \sigma_i)\}_{i=1}^l$)$\rightarrow\sigma$ and $\vec{y} = \Sigma_{i=1}^l \vec{m}_i$.

Turning to a security model for network coding signatures which is a natural extension of unforgeability against chosen message attack (UCMA), a homomorphic network signature scheme $\Sigma = $(Keygen, Sign, Verify, Combine) is considered to be secure if any probabilistic polynomial time adversary (PPT) has negligible advantage (as a function of the security parameter $\lambda \in \mathbb{N}$) in the following game:

1. The adversary $\mathcal{A}$ chooses an integer $n \in \mathbb{N}$ (polynomial in terms of the security parameter $\lambda$) and sends it to the challenger. The challenger runs Keygen($\lambda$, n), obtains (pk, sk) and sends pk to $\mathcal{A}$ 2. For i=1, ..., t,
    $\mathcal{A}$ chooses a $k_i$-dimensional vector space $V_i = $Span$\{\vec{m}_{i,1}, \ldots, \vec{m}_{i,k_i}\} \subset Z_p^n$ and sends $\{\vec{m}_1^i, \ldots, \vec{m}_{k_i}^i\}$ to the challenger. The challenger chooses a random $id_i \in Z_p$, returns $id_i$ and $\{\sigma_j^i \leftarrow $Sign(pk, sk, $id_i$, $\vec{m}_j^i$)$\}_{j=1}^{k_i}$ to $\mathcal{A}$.

3. The adversary $\mathcal{A}$ outputs a file identifier, message, signature tuple (id, $\vec{m}$, $\sigma$) and wins if
    (a) either of the following holds,
        id$\neq id_i$ for all i$\in[1, t]$
        id$\neq id_{i*}$ for some i*$\in[i, t]$, $\vec{m} \notin V_{i*}$
    (b) $\sigma$ is a valid signature for the file identifier id and the vector $\vec{m}$, in other words Verify(pk, id, $\vec{m}$, $\sigma$)$\rightarrow$Accept.

Further described herein is a stronger security model. While querying signatures for message vectors, the adversary can specify the file identifier on its own. A homomorphic network signature scheme $\Sigma = $(Keygen, Sign, Verify, Combine) is considered to be secure in the stronger security model if any probabilistic polynomial time adversary (PPT) has negligible advantage (as a function of the security parameter $\lambda \in \mathbb{N}$) in the following game:

1. The adversary $\mathcal{A}$ chooses an integer $n \in \mathbb{N}$ (polynomial in terms of the security parameter $\lambda$) and sends it to the challenger. The challenger runs Keygen($\lambda$, n), obtains (pk, sk) and sends pk to $\mathcal{A}$ 2. For i=1, ..., t, (c) $\mathcal{A}$ chooses a n-dimensional vector $\vec{m}_i$ and a file identifier $id_i$ on his own and sends $(id_i, \vec{m}_i)$ to the challenger. The challenger returns $\sigma_i \leftarrow \text{Sign}(pk, sk, id_i, \vec{m}_i)$ to $\mathcal{A}$ 3. Adversary $\mathcal{A}$ outputs a file identifier, message, signature tuple (id, $\vec{m}$, $\sigma$) and wins if (a) $\vec{m}$ can not be expressed as a linear combination of the vectors $\vec{m}_{j_1}, \ldots, \vec{m}_{j_k}$, where adversary has made the queries (id, $\vec{m}_{j_s}$) (for $1 \le s \le k$) to the challenger in the first phase.

(b) $\sigma$ is a valid signature for the file identifier id and the vector $\vec{m}$, in other words Verify(pk, id, $\vec{m}$, $\sigma$)→Accept.

Turning to a construction of Keygen($\lambda$, n):

Define gk=(p, $G_1$, $G_2$, $G_T$, e, $\mathcal{P}_1$, $\mathcal{P}_2$). $G_1$ and $G_2$ are cyclic groups of order p generated by $\mathcal{P}_1$, $\mathcal{P}_2$ respectively. e is a bilinear pairing $G_1 \times G_2 \to G_T$. Map $F: G_1^2 \times G_2^2 \to G_T^4$ is defined as:

$$F((X_1, X_2), (Y_1, Y_2)) = \begin{pmatrix} e(X_1, Y_1) & e(X_1, Y_2) \\ e(X_2, Y_1) & e(X_2, Y_2) \end{pmatrix}.$$

Choose $\alpha_1, \alpha_2, t_1, t_2 \leftarrow \mathbb{Z}_p^*$ at random. Define, $\vec{u} = (u_1, u_2)^T$, where $u_1 = (\mathcal{P}_1, \alpha_1 \mathcal{P}_1), u_2 = t_1 u_1$, $\vec{v} = (v_1, v_2)^T$, where $v_1 = (\mathcal{P}_2, \alpha_2 \mathcal{P}_2), v_2 = t_2 v_1$.

Define the maps $\iota'_1: \mathbb{Z}_p \to G_1^2$ and $\iota_2: G_2 \to G_2^2$ as follows.

$\iota'_1(z) = zu$, where $u = u_2 + (\mathcal{P}, \mathbb{Z}_1)$ and $\iota_2(\mathcal{Z}) = (\mathcal{O}, \mathcal{Z})$.

Choose $\vec{x} = (x_1, \ldots, x_n)^T, \vec{r} = (r_1, \ldots, r_n)^T, \leftarrow \mathcal{O}_p^n$ at random. Define, $\vec{c} = -\iota'_1(\vec{x}) + \vec{r} u_1$, where $\iota'_1(\vec{x}) = (\iota'_1(x_1), \ldots, \iota_1(x_n))^T$.

Output pk=(gk, $\vec{u}, \vec{v}, \vec{c}$) as public key and sk=($\vec{x}, \vec{r}$) as secret key.

A construction of Sign(pk, sk, $\vec{m} = (m_1, \ldots, m_n)^T$) is:

Given a message $\vec{m} \in \mathbb{Z}_p^n$, define $\vec{M} = (m_1 \mathcal{P}_2, \ldots, m_n \mathcal{P}_2)^T$. Solve for, $Y \in G_2$, s.t.

$Y - \vec{x}^T \cdot \vec{M} = 0$.

Choose $S \leftarrow \text{Mat}_{1 \times 2}(\mathbb{Z}_p)$, $T \leftarrow \text{Mat}_{2 \times 1}(\mathbb{Z}_p)$ randomly and evaluate the following.

$d = \iota_2(Y) + S \vec{v}$.

$\pi = \vec{r}^T \iota_2(\vec{M}) - T^T \vec{v}$.

$\vec{\Theta} = S^T \iota'_1(1) + T u_1$.

Output $\sigma = (d, \pi, \vec{\Theta})$ as signature of $\vec{m}$.

A construction of Verify(pk, $\vec{m} = (m_1, \ldots, m_n)^T$, $\sigma = (d, \pi, \vec{\Theta})$ is:

For vectors $\vec{p} = (p_1, \ldots, p_k)^T \in (G_1^2)^k$ $\vec{q} = (q_1, \ldots, q_k)^T \in (G_2^2)^k$, the operation $\cdot : (G_1^2)^k \times (G_2^2)^k \to G_T^4$ (for any $k \in \mathbb{N}$) is defined as:

$$\vec{p}^T \cdot \vec{q} = \sum_{i=1}^{k} F(p_i, q_i).$$

Define $\vec{M} = \vec{m} \mathcal{P}_2$ and output Accept if the following equation holds, otherwise Reject.

$F(\iota_1'(1), d) + \vec{c} \cdot \iota_2(\vec{M}) = F(u_1, \pi) + \vec{\Theta} \cdot \vec{v}$, A construction if Combine(pk, $\{(\beta_i, \sigma_i = (d_i, \pi_i, \vec{\Theta}_i))\}_{i=1}^l$) is:

Output $\sigma = (\sum_{i=1}^l \beta_i d_i, \sum_{i=1}^l \beta_i \pi_i, \sum_{i=1}^l \beta_i \vec{\Theta}_i)$.

Security of the above signature scheme is based on the following assumption. Consider groups ($G_1, G_2, G_T$) of prime order p, for which a bilinear pairing $e: G_1 \times G_2 \to G_T$ is computable. Also, for any n-dimensional vector $\vec{x} = (x_1, \ldots, x_n)^T$ over $\mathbb{Z}_p$, $\mathcal{P}_1 \in G_1$ and $\mathcal{P}_2 \in G_2$, define and oracle $\mathcal{O}^{\vec{x}, \mathcal{P}_2}(\cdot)$ which on input an n-dimensional vector $\vec{m} = (m_1, \ldots, m_n)^T$ over $\mathbb{Z}_p$ returns $x_1 m_1 \mathcal{P}_2 + \ldots + x_n m_n \mathcal{P}_2$.

Assumption 1. For any $n \in \mathbb{N}$ (polynomial in terms of the security parameter $\lambda$), let $\vec{x}$ be a random vector of dimension n over $\mathbb{Z}_p$ and $\mathcal{P}_1, \mathcal{P}_2$ be the generators of the groups $G_1, G_2$. Given $\mathcal{P}_1, \mathcal{P}_2, G_1, G_2, G_T, e, p, \vec{x} \mathcal{P}_1$ and oracle access to $\mathcal{O}^{\vec{x}, \mathcal{P}_2}(\cdot)$, it is infeasible to output an n-dimensional vector $\vec{m} = (m_1, \ldots, m_n)^T$ over $\mathbb{Z}_p$ and $Y \in G_2$ s.t.

1. $\vec{m}$ can not be expressed as linear combination of the vectors queried to the oracle $\mathcal{O}^{\vec{x}, \mathcal{P}_2}(\cdot)$ and, 2. $Y = x_1 m_1 \mathcal{P}_2 + \ldots + x_n m_n \mathcal{P}_2$.

By way of proof, suppose there exists an adversary $\mathcal{A}$ that breaks the security (as defined above) of the scheme with advantage $\epsilon$ (non-negligible in terms of the security parameter $\lambda$). An algorithm $\mathcal{B}$ with black box access to $\mathcal{A}$ which breaks Assumption 1 with advantage $\epsilon$, is constructed.

Algorithm $\mathcal{B}$:

Input: $\mathcal{P}_1, \mathcal{P}_2, G_1, G_2, G_T, e, p, \vec{x} \mathcal{P}_1$ and oracle access to $\mathcal{O}^{\vec{x}, \mathcal{P}_2}(\cdot)$.

Output: $\vec{x}$ and Y satisfying condition 1 and 2 in Assumption 1.

Algorithm $\mathcal{B}$ acts as challenger in the security game as depicted above, and simulates Keygen and Sign such that $\mathcal{A}$ can not distinguish between simulated output and original Keygen, Sign output. $\mathcal{B}$ uses the forged signature from $\mathcal{A}$ to output $(\vec{x}, Y)$. Below are the SimKeygen and SimSign routines used by algorithm $\mathcal{B}$ SimKeygen($\lambda$, n)

The operation proceeds as with Keygen($\lambda$, n), except choosing $\vec{x}, \vec{x}'$ on its own, and evaluating $\iota_1'(\vec{x})$ as follows.

$\iota_1'(\vec{x}) = \vec{x} u$ $= \vec{x}(u_2 + (\mathcal{O}, P_1))$

-continued $$= \vec{x}(t_1 u_1 + (O, P_1))$$
$$= \vec{x}(t_1(P_1, \alpha_1 P_1) + (O, P_1))$$
$$= \vec{x} P_1(t_1, (\alpha_1 t_1 + 1)).$$

Hence public key pk=(gk, $\vec{u}$, $\vec{v}$, $\vec{c}$) can be output (with gk=(e, $G_1$, $G_2$, $G_T$, $\mathcal{P}_1$, $\mathcal{P}_2$)). As a secret key, instead of ($\vec{x}$, $\vec{r}$) there is ($\vec{x}\mathcal{P}_1$, $\vec{r}$).

SimSign($\vec{m}=(m_1, \ldots, m_n)^T$)

As $\vec{x}$ is not known, Y cannot really be solved. However, the oracle does so; if querying $\mathcal{O}^{\vec{x},\mathcal{P}_2}(\vec{m})$ gets back the required Y. Afterwards, following the Sign procedure generates valid signature.

If $\mathcal{A}$ returns a valid forgery, from the commitment d of Y, Y may be extracted using trapdoor $\alpha_2$ and break Assumption 1.

Turning to one homomorphic network coding signature scheme described herein, the scheme uses bilinear pairings on prime order groups. It is provably secure in the standard model.

For Keygen($\lambda$, n):
Define gk=(p, $G_1$, $G_2$, $G_T$, e, $\mathcal{P}_1$, $\mathcal{P}_2$). $G_1$, $G_2$ are cyclic groups of order p generated by $\mathcal{P}_1$, $\mathcal{P}_2$ respectively. e is a bilinear pairing $G_1 \times G_2 \to G_T$. Choose, $\vec{x}$, $\vec{x}' \in Z_p^n$ and $x_{n+1} \in Z_p$ at random. Publish pk=(gk, $\vec{x}P_1$, $\vec{x}'P_1$, $x_{n+1}P_1$) as public key and keep sk=($\vec{x}$, $\vec{x}'$, $x_{n+1}$) as secret key.

For Sign (pk, sk, id, $\vec{m}=(m_1, \ldots, m_n)^T$):
Choose $\vec{r} \in Z_p^n$ randomly. Evaluate $$Y = \frac{(\vec{m}^T \cdot \vec{x} + \vec{r}^T \cdot \vec{x}'^T) P_2}{id + x_{n+1}}.$$

Output $\sigma=(Y, \vec{r})$ as signature of $\vec{m}$ with file identifier id.

For Verify(pk, id, $\vec{m}=(m_1, \ldots, m_n)^T$, $\sigma=(Y, \vec{r})$):
Output Accept if the following equation holds, otherwise Reject.

$$e((x_{n+1}\mathcal{P}_1)+id\mathcal{P}_1, Y) = e(\vec{m}^T \cdot (\vec{x}\mathcal{P}_1) + \vec{r}^T \cdot (\vec{x}'\mathcal{P}_1), \mathcal{P}_2)$$

For Combine(pk, $\{(\beta_i, \sigma_i=(Y_i, \vec{r}_i))\}_{i=1}^l$):
Output $\sigma=(\Sigma_{i=1}^l \beta_i Y_i, \Sigma_{i=1}^l \beta_i \vec{e}_i)$.
The homomorphic network coding signature scheme described above, is secure if the following assumptions are true.

Assumption 2. For any $n \in \mathbb{N}$ (polynomial in terms of the security parameter $\lambda$), $\vec{x}$ be a random vector of dimension n over $\mathbb{Z}_p$. $x_{n+1}$ be a random element from $Z_p$. $\mathcal{P}_1$, $\mathcal{P}_2$ be the generators of the groups $G_1$, $G_2$ of order p, supporting an efficient bilinear pairing e:$G_1 \times G_2 \to G_T$. Given $\mathcal{P}_1$, $\mathcal{P}_2$, $G_1$, $G_2$, $G_T$, e, p, $\vec{x}\mathcal{P}_1$, $x_{n+1}\mathcal{P}_1$ and following t (polynomial in terms of security parameter $\lambda$) many (2n−1)-tuples $$\left(w_1^1, \ldots, w_{n-1}^1, w_n^1, \frac{x_1 + w_1^1 x_n}{x_{n+1} + w_n^1} P_2, \ldots, \frac{x_{n-1} + w_{n-1}^1 x_n}{x_{n+1} + w_n^1} P_2\right)$$
$$\vdots$$
$$\left(w_1^t, \ldots, w_{n-1}^t, w_n^t, \frac{x_1 + w_1^t x_n}{x_{n+1} + w_n^t} P_2, \ldots, \frac{x_{n-1} + w_{n-1}^t x_n}{x_{n+1} + w_n^t} P_2\right)$$

where $w_1^i, \ldots, w_n^i$ are random elements from $Z_p$ for i=1, ..., t; it is infeasible to output $$\frac{x_n P_2}{x_{n+1} + w_n^i}$$

for any $i \in [1, \ldots, t]$.

The previous assumption constitutes the core of the security proof, as it essentially provides the homomorphic property being sought.

Assumption 3. Let x be a random element from $Z_p$. Let $\mathcal{P}_1$, $\mathcal{P}_2$ be the generators of the groups $G_1$, $G_2$ of order p supporting an efficient bilinear pairing e:$G_1 \times G_2 \to G_T$. Given $\mathcal{P}_1$, $\mathcal{P}_2$, $G_1$, $G_2$, $G_T$, e, p, $x\mathcal{P}_1$ and the following k (polynomial in terms of security parameter $\lambda$) many 2-tuples $$\left(w^1, \frac{\mathcal{P}_2}{x+w^1}\right), \ldots, \left(w^k, \frac{\mathcal{P}_2}{x+w^k}\right),$$

where $w^1, \ldots, w^k$ are random elements from $Z_p$, it is infeasible to output $$\left(w, \frac{\mathcal{P}_2}{x+w}\right),$$

where $w \notin \{w^1, \ldots, w^k\}$.

For any forger $\mathcal{A}$ breaking the homomorphic network signature scheme from above, define an adversary(simulator) $\mathcal{B}$ which breaks either Assumption 2 or Assumption 3. The adversary $\mathcal{B}$ uses forger $\mathcal{A}$ as black box and needs to simulate challenger responses as in the security game defined above. In the end forger $\mathcal{A}$ either returns a forged signature for a file identifier that it has already seen (Type-I forgery) or for a new file identifier (Type-II forgery). Different simulation procedures are described for different type of forgeries. In the beginning $\mathcal{B}$ chooses a simulation procedure randomly. Even though in the beginning $\mathcal{B}$ does not know what kind of forger it is interacting with, it always chooses the correct simulation procedure with non-negligible probability.

For the type—I forgery, the forger returns (id, m, $\sigma$), and id=$id_{i^*}$ for some $i^* \in [i, t]$. In step 2 of the security game, for i=1, ..., t the adversary asked for signatures for a $k_i$ dimensional vector space $V_i$=Span$\{\vec{m}_1, \ldots, \vec{m}_{k_i}\}$. Even though $k_i$ is less than or equal to n−1, the simulator generates a random n−1 dimensional vector space $V_i' \supseteq V_i$. Afterwards, the simulator generates signatures for $V_i'$. However, it only gives back signatures corresponding to $V_i$ to the forger. After the forger returns a Type-I forgery (id, m, $\sigma$), in case $m \in V_i'$ (but not in $V_i$) the simulator aborts. However, adversary $\mathcal{B}$ tosses a random coin, and with equal probabilities it tries to break Assumption 1 or Assumption 2.

For Case I—Breaking Assumption 2, given an instance of Assumption 2 problem.

SimKeygen($\lambda$,n)

Define $gk=(p, G_1, G_2, G_T, e, \mathcal{P}_1, \mathcal{P}_2)$. Choose a random diagonal matrix $T=\text{diag}(t_1, \ldots, t_n) \in \text{Mat}_{n \times n}(\mathbb{Z}_p)$. Define $\vec{x}' \text{athcalP}_1 = T \cdot \vec{x} \mathcal{P}_1$. Output $$pk=(gk, \vec{x}\mathcal{P}_1, \vec{x}'\mathcal{P}_1, x_{n+1}\mathcal{P}_1)$$

as a public key, and keep T as secret.

$$\text{SimSign}(V_i = \text{Span}\{\vec{m}_1^i, \ldots, \vec{m}_{k_i}^i\})$$

Choose $(n-1-k_i)$ many random messages $\vec{m}_{k_i+1}^i, \ldots, \vec{m}_{n-1}^i$. Suppose $V_i' = \text{Span}\{\vec{m}_1^i, \ldots, \vec{m}_{n-1}^i\}$. Choose a random matrix $$R^i = \begin{bmatrix} r_{1,1}^i & \cdots & r_{1,n-1}^i \\ \vdots & \ddots & \vdots \\ r_{n-1,1}^i & \cdots & r_{n-1,n-1}^i \end{bmatrix} \in \text{Mat}_{(n-1) \times (n-1)}(\mathbb{Z}_p).$$

Abort if $R^i$ is non invertible. Define $U^i = [R^i | R^i \cdot \vec{w}^i]$, where $\vec{w}^i = (w_1^i, \ldots, w_{n-1}^i)$.
Evaluate $\vec{r}'_1^i, \ldots, \vec{r}'_{n-1}^i$ s.t.

$$[\vec{r}'_1^i | \ldots | \vec{r}'_{n-1}^i]^T = (U^i - [\vec{m}_1^i, \ldots, \vec{m}_{n-1}^i]^T) \cdot T^{-1}.$$

Output $id_i = w_n^i$ and $(\sigma_1^i, \ldots, \sigma_{k_i}^i)$ where, $$\sigma_j^i = \left( \sum_{k=1}^{n-1} \frac{r_{j,k}^i (x_k + w_k^i x_n)}{x_{n+1} + w_n^i} \mathcal{P}_2, \vec{r}'^i_j \right)$$

for $j=1, \ldots, k_i$.

If the adversary $\mathcal{A}$ returns a forgery $(id, \vec{m}, \sigma)$ s.t. $id \notin [w_n^1, \ldots, w_n^r]$ Abort. Also, Abort if $id = w_n^{i*}$ and $\vec{m} \in V_{i*}'$. Write $\sigma$ as $(Y, \vec{r})$ and define $$\vec{w} = \vec{m} + \vec{r} \cdot T.$$

If $\sigma$ is a valid signature there is $$Y = \frac{\vec{w}^T \cdot \vec{x}}{x_{n+1} + w_n^{i*}} \mathcal{P}_2.$$

If $\vec{w} \notin \text{Rowspace}(U^{i*})$ one can find out $$\frac{x_n \mathcal{P}_2}{x_{n+1} + w_n^{i*}}$$

by Gauss Elimination. If $\vec{w} \in \text{Rowspace}(U^{i*})$, abort.

For case II of—Breaking Assumption 2, when $\vec{w} \in \text{Rowspace}(U^{i*})$:
Define $\vec{u}_1^i, \ldots, \vec{u}_{n-1}^i$ s.t.

$$U^i = [\vec{u}_1^i | \ldots | \vec{u}_{n-1}^i]^T$$

In this case, the simulator can find out one of $t_j$'s, given $\vec{x}\mathcal{P}_1, \vec{x}'\mathcal{P}_1, \vec{x}\mathcal{P}_2, \vec{x}'\mathcal{P}_2$ for random $\vec{x}, \vec{x}'$. As, $$\left( \vec{r} - \sum_{k=1}^{n-1} \lambda_k \vec{r}_k'^{i*} \right) \cdot T = - \left( \vec{m} - \sum_{k=1}^{n-1} \lambda_k \vec{m}_k^{i*} \right).$$

This is essentially breaking a variant of discrete log problem in $G_1$ and $G_2$, using this solver can again break Assumption 2.

With respect to Case III—Breaking Assumption 3, in this case the adversary forges with a different file identifier, or $id \notin [w_n^1, \ldots, w_n^r]$. In this case $\mathcal{B}$ chooses $\vec{r}, \vec{r}'$, on its own, takes $x_{n+1}\mathcal{P}_1$ from the problem instance, and releases $(gk, \vec{x}\mathcal{P}_1, \vec{x}'\mathcal{P}_2, x_{n+1}\mathcal{P}_1)$ as a public key. Using $\vec{x}, \vec{x}'$ and the problem instance of Assumption 3, signing is straightforward. Also, having a valid forgery where $id \notin [w_n^1, \ldots, w_n^r]$, one can easily break Assumption 3.

With respect to generic security of the assumptions, a lower bound is provided on the computational complexity of the assumptions in the generic group model. The original model is extended to account for multiple groups and bilinearlity. In the general bilinear group model, the elements of $G_1$, $G_2$ and $G_T$ are encoded as arbitrary unique strings, whereby no information other than equality can be directly tested by the adversary. The adversary performs operations on group elements by interacting with various oracles. The adversary has access to the following oracles:
three oracles for the group operation in each of the three groups $G_1$, $G_2$ and $G_T$,
two oracles for the homomorphism $\psi: G_1 \rightarrow G_2$ and its inverse $\psi^{-1}$ and
one oracle for the bilinear pairing $e: G_1 \times G_2 \rightarrow G_T$.

This model actually gives more power to the adversary in bilinear groups where $\psi$ or $\psi^{-1}$ cannot be computed efficiently. To simulate the working of the oracles, the encodings of the elements of $G_1$, $G_2$, $G_T$ are modeled using injective functions $\zeta_1, \zeta_2, \zeta_T: \mathbb{Z}_p \rightarrow \{0,1\}^{\lceil \log_2 p \rceil}$, where p is the group order. Internally, the simulator represents the elements of $G_1$, $G_2$, $G_T$ not as themselves but as their discrete logarithms relative to some arbitrary generators $g_1$, $g_2$, $g_T$. The functions $\zeta_1, \zeta_2, \zeta_T$ map a, b, $c \in \mathbb{Z}_p$ to the external string representations $\zeta_1(a), \zeta_2(b), \zeta_T(c) \in \{0,1\}^{\lceil \log_2 p \rceil}$ of the elements $g_1^a \in G_1, g_2^b \in G_2, g_T^c \in G_T$. The adversary knows $|G_1|=|G_2|=|G_T|=p$ and communicates with the oracles using the string representation of the group elements exclusively.

Theorem 1: Suppose $\mathcal{A}$ is an algorithm that breaks Assumption 3 in generic bilinear groups of order p with $k \in \mathbb{N}$ (polynomial in terms of the security parameter $\lambda$), making at most q oracle queries for the group operations in $G_1$, $G_2$, $G_T$, the homomorphisms $\psi$ and $\psi^{-1}$, and the bilinear pairing e, all counted together. Suppose also that the integers $x, w^1, \ldots, w^k \in \mathbb{Z}_p$ and the encoding functions $\zeta_1, \zeta_2, \zeta_T$ are chosen at random. Then, the probability $\epsilon$, that $\mathcal{A}$ on input $$\left( p, \zeta_1(x), \left( w^1, \zeta_2\left(\frac{1}{x+w^1}\right) \right) \ldots, \left( w^k, \zeta_2\left(\frac{1}{x+w^k}\right) \right) \right)$$

outputs $$\left( w, \zeta_2\left(\frac{1}{x+w}\right) \right)$$

with $w \in \mathbb{Z}_p \setminus \{w_1, \ldots, w_k\}$, $$\epsilon = Pr\left[\mathcal{A}^G\left(p, \zeta_1(x), \left(w^1, \zeta_2\left(\frac{1}{x+w^1}\right)\right) \ldots, \left(w^k, \zeta_2\left(\frac{1}{x+w^k}\right)\right)\right) = \left(w, \zeta_2\left(\frac{1}{x+w}\right)\right)\right]$$

is bounded as $$\epsilon \leq \frac{2(q+k+1)^2(k+1)}{p}.$$

By way of proof, consider an algorithm $\mathcal{B}$ that plays the following game with $\mathcal{A}$. Initially $\mathcal{B}$ picks $w^1, \ldots, w^k \in_R \mathbb{Z}_p$ at random. $\mathcal{B}$ also maintains three lists of pairs $L_1 = \{(F_{1,i}, \zeta_{1,i}) : i=1, \ldots, \tau_1\}$, $L_2 = \{(F_{2,i}, \zeta_{2,i}) : i=1, \ldots, \tau_2\}$ and $L_T = \{(F_{T,i}, \zeta_{T,i}) : i=1, \ldots, \tau_T\}$, such that at step T in the game (after $\mathcal{A}$ has made $\tau$ many oracle queries), there is $\tau_1 + \tau_2 + \tau_T = \tau + k + 1$. Here $F_{1,i}$ and $F_{2,i}$ are linear polynomials in $$\mathbb{Z}_p\left[X, \frac{1}{X+w^1}, \ldots, \frac{1}{x+w^k}\right].$$

$F_{T,i}$'s are quadratic polynomials in $$\mathbb{Z}_p\left[X, \frac{1}{X+w^1}, \ldots, \frac{1}{x+w^k}\right].$$

The entries are $\zeta_{1,i}, \zeta_{2,i}, \zeta_{T,i}$ are the strings given to algorithm $\mathcal{A}$ by $\mathcal{B}$. At step $\tau=0$, the lists are initialized by setting $\tau_1 = 1$, $\tau_2 = k$ and $\tau_T = 0$, and assigning $$F_{1,1} = x, F_{2,1} = \frac{1}{X+w^1}, \ldots, F_{2,k} = \frac{1}{X+w^k}.$$

The strings $\zeta_{1,1}, \zeta_{2,1}, \ldots, \zeta_{2,k}$ are initialized to distinct random strings.

Assume that $\mathcal{A}$ only makes oracle queries on strings previously obtained from $\mathcal{B}$. Hence, given any query string $\zeta_{1,i}$, it is easy for $\mathcal{B}$ to determine its index i into the table $L_1$, and from there the corresponding expression $F_{1,i}$. If the same string appears multiple times in the list $L_1$ the ties are broken arbitrarily. (The same applies to $L_2$ and $L_T$.) To start the game, $\mathcal{B}$ provides $\mathcal{A}$ the string $\zeta_{1,1}$ and following k-many 2-tuples:

$$(w^1, \zeta_{2,1}), \ldots, (w^k, \zeta_{2,k})$$

that correspond to the Assumption 3 challenge instance. $\mathcal{B}$ answers $\mathcal{A}$'s queries as follows:

Group Operations: $\mathcal{A}$ may request a group operation in $G_1$ as a multiplication or as a division. Before answering the query the simulator $\mathcal{B}$ starts by incrementing the $\tau_1$ counter by one. $\mathcal{A}$ gives $\mathcal{B}$ two operands $\zeta_{1,i}, \zeta_{1,j}$ with $1 \leq i,j < \tau_1$, and a multiply/divide selection bit. To respond, $\mathcal{B}$ creates a polynomial $F_{1,\tau_1}$ $$\in \mathbb{Z}_p\left[X, \frac{1}{X+w^1}, \ldots, \frac{1}{x+w^k}\right]$$

which it sets to $F_{1,\tau_1} \leftarrow F_{1,i} + F_{1,j}$ for a multiplication or to $F_{1,\tau_1} \leftarrow F_{1,i} - F_{1,j}$ for a division. If the result is identical to an earlier polynomial $F_{1,l}$ for some $l < \tau_1$, the simulator $\mathcal{B}$ duplicates the string representation $\zeta_{1,\tau_1} \leftarrow \zeta_{1,l}$; otherwise, it lets $\zeta_{1,\tau_1}$ be a fresh random string in $\{0,1\}^{\lceil \log_2 p \rceil}$ distinct from $\zeta_{1,1}, \ldots, \zeta_{1,\tau_1-1}$. The simulator appends the pair $(F_{1,\tau_1}, \zeta_{1,\tau_1})$ to the list $L_1$ and gives the string $\zeta_{1,\tau_1}$ to $\mathcal{A}$. Group operation queries in $G_2$ and $G_T$ are answered in a similar manner, based on the lists $L_2$ and $L_T$ respectively.

Homomorphism: To answer an inverse homomorphism query $\psi^{-1} : G_2 \to G_1$, the simulator starts by incrementing the $\tau_1$ counter by one. $\mathcal{A}$ gives to $\mathcal{B}$ a string operand $\zeta_{2,i}$ with $1 \leq i < \tau_2$. To respond, $\mathcal{B}$ makes a copy of the associated $L_2$ polynomial in $L_1$: it sets $F_{1,\tau_1} \leftarrow F_{2,i}$. If $L_1$ already contained a copy of the polynomial, i.e. $F_{1,\tau_1} = F_{1,l}$ for some $l < \tau_1$, the simulator $\mathcal{B}$ duplicates the string representation $\zeta_{1,\tau_1} \leftarrow \zeta_{1,l}$; otherwise, it lets $\zeta_{1,\tau_1}$ be a fresh random string in $\{0,1\}^{\lceil \log_2 p \rceil}$ distinct from $\zeta_{1,1}, \ldots, \zeta_{1,\tau_1-1}$. The simulator appends the pair $(F_{1,\tau_1}, \zeta_{1,\tau_1})$ to the list $L_1$ and gives the string $\zeta_{1,\tau_1}$ to $\mathcal{A}$. The homomorphism queries $\psi : G_1 \to G_2$ are also answered similarly.

Pairing: A pairing query comprise two operands $\zeta_{1,i}$ and $\zeta_{2,i}$ with $1 \leq i \leq \tau_1$ and $1 \leq j \leq \tau_2$ for the current values of $\tau_1$ and $\tau_2$. Upon receipt of such a query from hcalA, the counter $\tau_T$ is incremented. The simulator then computes the product of the polynomials $F_{T,\tau_T} \leftarrow F_{1,i} \cdot F_{2,j}$. If $L_T$ already contained a copy of the polynomial, i.e. $F_{T,\tau_T} = F_{T,l}$ for some $l < \tau_T$, the simulator $\mathcal{B}$ duplicates the string representation $\zeta_{T,\tau_T} \leftarrow \zeta_{T,l}$; otherwise, it lets $\zeta_{T,\tau_T}$ be a fresh random string in $\{0,1\}^{\lceil \log_2 p \rceil}$ distinct from $\zeta_{T,1}, \ldots, \zeta_{T,\tau_T-1}$. The simulator appends the pair $(F_{T,\tau_T}, \zeta_{T,\tau_T})$ to the list $L_T$ and gives the string $\zeta_{T,\tau_T}$ to $\mathcal{A}$.

As can be seen, the polynomials in the lists $L_1$ and $L_2$ are of degree at most one in $$\mathbb{Z}_p\left[X, \frac{1}{x+w^1}, \ldots, \frac{1}{X+w^k}\right].$$

Also the polynomials in the list $L_T$ are of degree at most two in $$\mathbb{Z}_p\left[X, \frac{1}{x+w^1}, \ldots, \frac{1}{X+w^k}\right].$$

Observe that the following invariant is preserved throughout the game, where T is the total number of oracle queries that have been answered at any given time:

$$\tau_1 + \tau_2 + \tau_T = \tau k + 1. \qquad (2)$$

When $\mathcal{A}$ terminates it returns a pair $(w, \zeta_{2,l})$ where $w \in \mathbb{Z}_p \setminus \{w^1, \ldots, w^k\}$ and $1 \leq l \leq \tau_2$. From $\zeta_{2,l}$ and the $L_2$, $\mathcal{B}$ finds the corresponding polynomial $F_{2,l}$. $\mathcal{B}$ then picks a random $x \in \mathbb{Z}_p$ and evaluates the polynomials $F_{1,i}$, $F_{2,j}$, $F_{T,k}$ for $1 \leq i \leq \tau_1$, $1 \leq j \leq \tau_2$, $1 \leq k \leq \tau_T$ including $F_{2,l}(x)$. For $\mathcal{A}$'s answer to be correct in the simulation framework, there needs to be:

$$F_{2,l}(X) = \frac{1}{X+w}, \qquad (3)$$

for X=x. As, $F_{2,l}$ is linear in $$\mathbb{Z}_p\left[X, \frac{1}{x+w^1}, \ldots, \frac{1}{X+w^k}\right]$$

and $w \notin \{w_1, \ldots, w_k\}$ equation (3) is never an identity. In fact, equation (3) can be reduced to an equation in $\mathbb{Z}_p[X]$ of degree at most k+2. Hence equation (3) holds with probability at most $$\frac{k+2}{p}.$$

Note that the simulation fails when two non-identical polynomials in either of the three lists $L_1$, $L_2$ or $L_T$ evaluates to same value in $\mathbb{Z}_p$ because of the assignment X←x. Observe that For $\alpha \in \{1,2\}$, $1 \le i$, $j \le \tau_\alpha$, $F_{\alpha,i} \ne F_{\alpha,j}$, the equation $F_{\alpha,i}(X) = F_{\alpha,j}(X)$ can be reduced to an equation in $\mathbb{Z}_p[X]$ of degree at most k+1.

For $1 \le i$, $j \le \tau_T$, $F_{T,i} \ne F_{T,j}$, the equation $F_{T,i}(X) = F_{T,j}(X)$ can be reduced to an equation in $\mathbb{Z}_p[X]$ of degree at most 2(k+1).

Now summing over the cases where $\mathcal{A}$ wins, $$\epsilon \le \binom{\tau_1}{2}\frac{k+1}{p} + \binom{\tau_2}{2}\frac{k+1}{p} + \binom{\tau_T}{2}\frac{2(k+1)}{p} + \frac{k+2}{p}.$$

From equation (2) it is known that the game ends with $\tau_1 + \tau_2 + \tau_T = q + k + 1$. Hence, $$\epsilon \le \frac{2(q+k+1)^2(k+1)}{p}.$$

Theorem 2: Suppose $\mathcal{A}$ is an algorithm, that breaks Assumption 2 in generic bilinear groups of order p, with k, n∈ℕ (polynomial in terms of the security parameter λ), making a t most q oracle queries for the group operations in $G_1$, $G_2$, $G_T$, the isomorphisms ψ and $\psi^{-1}$, and the bilinear pairing e, counted together. The integers $w_j^i$, $x_j \in \mathbb{Z}_p$, i=1 ... t, j=1 ... n, j'=1 ... n+1, as well the encoding functions $\zeta_1$, $\zeta_2$, $\zeta_T$ are chosen at random. Then the probability $\epsilon$, that $\mathcal{A}$ on input $(p, \zeta_1(x_1), \ldots, \zeta_1(x_{n+1}))$ $$\left(w_1^1, \ldots, w_{n-1}^1, w_n^1, \zeta_2\left(\frac{x_1 + w_1^1 x_n}{x_{n+1} + w_n^1}\right), \ldots, \zeta_2\left(\frac{x_{n-1} + w_{n-1}^1 x_n}{x_{n+1} + w_n^1}\right)\right)$$

$$\vdots$$

$$\left(w_1^t, \ldots, w_{n-1}^t, w_n^t, \zeta_2\left(\frac{x_1 + w_1^t x_n}{x_{n+1} + w_n^t}\right), \ldots, \zeta_2\left(\frac{x_{n-1} + w_{n-1}^t x_n}{x_{n+1} + w_n^t}\right)\right)$$

outputs $$\zeta_2\left(\frac{x_n}{x_{n+1} + w_n^i}\right)$$

for some i=1, ..., t; can be bounded as, $$\epsilon \le \frac{(t+1)(\tau + (n-1)t + n + 1)(\tau + nt + n + 1)}{p}.$$

By way of proof, proceed as in the previous theorem. However, note that $F_{1,i}$ and $F_{2,i}$ are quadratic multinomials in $$\mathbb{Z}_p\left[X_1, \ldots, X_{n+1}, \frac{1}{X_{n+1} + w_n^1}, \ldots, \frac{1}{X_{n+1} + w_n^t}\right];$$

(note, quadratic terms are only of the type $$\frac{X_j}{X_{n+1} + w_n^{i'}}$$

for j=1, ..., n; i'=1, ..., t. Moreover, $F_{1,i}$ and $F_{2,i}$'s can never be of the form $$\frac{X_n}{X_{n+1} + w_n^{i'}}$$

for any i'=1, ..., t. $F_{T,i}$'s are multinomials of degree four in $$\mathbb{Z}_p\left[X_1, \ldots, X_{n+1}, \frac{1}{X_{n+1} + w_n^1}, \ldots, \frac{1}{X_{n+1} + w_n^t}\right];$$

(note that cubic terms are of the form $$\frac{X_{j_1} X_{j_2}}{X_{n+1} + w_n^{i'}} \text{ or } \frac{X_j}{(X_{n+1} + w_n^{i'_1})(X_{n+1} + w_n^{i'_2})}$$

and degree four terms are of the form $$\frac{X_{j_1} X_{j_2}}{(X_{n+1} + w_n^{i'_1})(X_{n+1} + w_n^{i'_2})})$$

for j, $j_1$, $j_2$=1, ..., n; i', $i'_1$, $i'_2$=1, ..., t.) In the end the adversary will succeed if there exists an i∈[1, ..., $\tau_1$] such that a random assignment of $X_j$'s satisfy the equation $$F_{2,i} = \frac{X_n}{X_{n+1} + w_n^{i'}}, \qquad (4)$$

for some i'=1, ..., t. For any fixed values of $X_1, \ldots, X_{n-1}$, $X_{n+1}$, equation (4) is either an identity or a linear equation in $X_n$. When it is a linear equation, equation (4) holds only with probability 1/p. The coefficient of $X_n$ is actually a linear polynomial in $$\mathbb{Z}_p\left[\frac{1}{X_{n+1}+w_n^1}, \ldots, \frac{1}{X_{n+1}+w_n^t}\right],$$

or equivalently a degree t polynomial in $\mathbb{Z}_p[X_n]$. Hence, a random assignment of $X_1, \ldots, X_{n+1}$ equation (4) holds at most with probability $$\frac{t}{p}+\frac{1}{p}=\frac{t+1}{p}.$$

Considering the fact, there are all together $\tau\tau_2$ values of (i, i'); the adversary can succeed only with probability $$\frac{t(t+1)\tau_2}{p}.$$

The adversary also wins if the random assignment of $X_i$'s causes a collision within the values of $F_{1,i}$'s (also for $F_{2,i}$'s and $F_{T,i}$'s). Following the description above, for $i_1 \neq i_2$ there is:

$$F_{1,i_1} = F_{1,i_2},$$

with probability at most $$\frac{t+1}{p}.$$

Hence, collision among $F_{1,i}$ values can occur with probability at most $$\binom{\tau_1}{2}\frac{t+1}{p}.$$

Similarly, collision among $F_{2,i}$ values can occur with probability at most $$\binom{\tau_2}{2}\frac{t+1}{p}.$$

In a similar line of argument, collision among $F_{T,i}$ values occur with probability at most $$\binom{\tau_T}{2}\frac{2(t+1)}{p}.$$

Also, $\tau_1+\tau_2+\tau_T=\tau(n-1)t+(n+1)$. Hence, $$\epsilon \leq \frac{t(t+1)\tau_2}{p} + \binom{\tau_1}{2}\frac{t+1}{p} + \binom{\tau_2}{2}\frac{t+1}{p} + \binom{\tau_T}{2}\frac{2(t+1)}{p}$$

$$\leq \frac{(t+1)(\tau+(n-1)t+n+1)(\tau+nt+n+1)}{p}$$

Described further is another standard model scheme, namely a homomorphic network coding signature scheme in the stronger security model. This scheme guarantees a stronger security. With this stronger notion of security, while making a query to the signing oracle, the adversary can choose the file identifier on its own. However, this scheme is based on a stronger oracle-based hardness assumption, and is based on Groth-Sahai Proof Systems with homomorphic property.

For Keygen($\lambda$, n):

Define gk=(p, $G_1$, $G_2$, $G_T$, e, $\mathcal{P}_1$, $\mathcal{P}_2$). $G_1$, $G_2$ are cyclic groups of prime order p generated by $\mathcal{P}_1$, $\mathcal{P}_2$ respectively. e is a bilinear pairing $G_1 \times G_2 \to G_T$. Also define map $F:G_1^2 \times G_2^2 \to G_T^4$ as follows.

$$F((X_1, X_2), (Y_1, Y_2)) = \begin{pmatrix} e(X_1, Y_1) & e(X_1, Y_2) \\ e(X_2, Y_1) & e(X_2, Y_2) \end{pmatrix}.$$

Choose $\alpha_1, \alpha_2, t_1, t_2 \leftarrow \mathbb{Z}_p^*$ at random. Define, $\vec{u}=(u_1,u_2)^T$, where $u_1=(\mathcal{P}_1, \alpha_1 \mathcal{P}_1), u_2=t_1 u_1$, $\vec{v}=(v_1,v_2)^T$, where $v_1=(\mathcal{P}_2, \alpha_2 \mathcal{P}_2), v_2=t_2 v_1$.

Define the maps $\iota'_1: Z_p \to G_1^2$ and $\iota_2: G_2 \to G_2^2$ as follows.

$\iota'_1(z)=zu$, where $u=u_2+(\mathcal{O}, \mathcal{P}, \mathbb{Z}_1)$ and $\iota_2(\mathcal{Z})=(\mathcal{O}, \mathcal{Z})$.

Choose $\vec{x}=(x_1, \ldots, x_{n+1})^T, \vec{r}=(r_1, \ldots, r_{n+1})^T \leftarrow \mathbb{Z}_p^{n+1}$ at random, Define $\vec{c}=-\iota'_1(\vec{x})+\vec{r}u_1$, where $\iota'_1(\vec{x})=(\iota'_1(x_1), \ldots, \iota_1(x_{n+1}))^T$.

Output pk=(gk, $\vec{u}, \vec{v}, \vec{c}$) as public key and sk=($\vec{x}, \vec{r}$) as secret key.

For Sign(pk, sk, id, $\vec{m}=(m_1, \ldots, m_n)^T$):

Given a message $\vec{m} \in \mathbb{Z}_p^n$ and file identifier id$\in \mathbb{Z}_p$n, solve for, $Y \in G_2$, s.t.

$$Y = \frac{(x_1 m_1 + \ldots + x_n m_n)\mathcal{P}_2}{id + x_{n+1}}.$$

In other words, $$idY - \vec{x}^T \cdot \vec{M} - \vec{x}^T \cdot \Gamma Y = 0. \quad (5)$$

where $\vec{M}=(m_1\mathcal{P}_2, \ldots, m_n\mathcal{P}_2, \mathcal{O})^T \in G_2^{n+1}$ and $\Gamma=(0, \ldots, 0, -1)^T \in Z_p^{n+1}$.

Choose $S \leftarrow \text{Mat}_{1 \times 2}(\mathbb{Z}_p)$, $T \leftarrow \text{Mat}_{2 \times 1}(\mathbb{Z}_p)$ randomly and evaluate the following.

$d=\iota_2(Y)+S\vec{v}$.

$\pi=\vec{r}^T \iota_2(\vec{M})+\vec{r}^T TS\vec{v}-T^T\vec{v}$.

$\vec{\Theta}=S^T \iota'_1(id)-S^T \Gamma^T \iota'_1(\vec{x})+Tu_1$.

Output $\sigma=(d, \pi, \vec{\Theta})$ as signature of $\vec{m}$ with file identifier id.

For verify(pk, id, $\vec{m}=(m_1, \ldots, m_n)^T, \sigma=(d, \pi, \vec{\Theta})$):

Define $\vec{M}=(m_1\mathcal{P}_2, \ldots, m_n\mathcal{P}_2, \mathcal{P})^T, \Gamma=(0, \ldots, 0, -1)^T \in Z_p^{n+1}$ and output Accept if the following equation holds, otherwise Reject.

$$F(\iota'_1(id), d) + \vec{c} \cdot (\iota_2(\vec{M})+\Gamma d) = F(u_1, \pi) + \vec{\Theta} \cdot \vec{v}, \quad (6)$$

For Combine(pk, $\{(\beta_i, \sigma_i=(d_i, \pi_i, \vec{\Theta}_i))\}_{i=1}^l$):

Output $\sigma=(\Sigma_{i=1}^l \beta_i d_i, \Sigma_{i=1}^l \beta_i \pi_i, \Sigma_{i=1}^l \beta_i \vec{\Theta}_i)$.

The above mentioned signature scheme a Groth-Sahai Proof System, where $\vec{c}$ and d are commitments for $\vec{x}$ and Y. Whereas $\pi$ and $\vec{\Theta}$ are the proofs that the committed values satisfy Equation (5), Equation (6), is the same as the verification equation of Groth-Sahai proofs. Hence, a correctly generated signature is always accepted by the Verify procedure. Also, the Combine procedure always generates correct signatures, as Equation (1) is linear in $\vec{M}$.

With respect to security and a complexity assumption, there are groups $(G_1, G_2, G_T)$ of prime order p, for which a bilinear pairing $e:G_1 \times G_2 \rightarrow G_T$ is computable. For any (n+1)-dimension vector $\vec{x}=(x_1, \ldots, x_{n+1})^T$ over $Z_p$, $\mathcal{A}_2 \in G_2$, define an oracle $\mathcal{O}_3^{\vec{x},y_2}(\cdot, \cdot)$ which on input $id \in Z_p$ and an n-dimensional vector $\vec{m}=(m_1, \ldots, m_n)^T$ over $Z_p$ returns $$\frac{(x_1 m_1 + \ldots + x_n m_n)\mathcal{P}_2}{id + x_{n+1}}$$

Assumption 4. For any $n \in \mathbb{N}$ (polynomial in terms of the security parameter $\lambda$), let $\vec{x}$ be a random vector of dimension (n+1) over $\mathbb{Z}_{pp}$, and $\mathcal{P}_1$, $\mathcal{P}_2$ be the generators of the groups $G_1$, $G_2$. Given $\mathcal{P}_1$, $\mathcal{P}_2$, $G_1$, $G_2$, $G_T$, e, p, $\vec{x}\mathcal{A}_1$ and oracle access to $\mathcal{O}^{\vec{x},y_2}(\cdot, \cdot)$ it is infeasible to output $id \in Z_p$, an n-dimensional vector $\vec{m}=(m_1, \ldots, m_n)^T$ over $\mathbb{Z}_p$ and $Y \in G_2$ s.t.

1. $\vec{m}$ can not be expressed as linear combination of the vectors queried to the oracle $\mathcal{O}^{\vec{x},y_2}(\cdot, \cdot)$ with file identifier id as first argument and, $$Y = \frac{(x_1 m_1 + \ldots + x_n m_n)\mathcal{P}_2}{id + x_{n+1}}. \qquad 2.$$

Suppose there exists an adversary $\mathcal{A}$ that breaks the security (as defined above) with advantage $\epsilon$ (non-negligible in terms of the security parameter $\lambda$). Constructed is an algorithm $\mathcal{B}$ with black box access to $\mathcal{A}$, which breaks Assumption 1 with advantage $\epsilon$.

Algorithm $\mathcal{B}$: Input: $\mathcal{A}_1$, $\mathcal{A}_2$, $G_1$, $G_2$, $G_T$, e, p, $\vec{x}\mathcal{A}_1$ and oracle access to $\mathcal{O}^{\vec{x},y_2}(\cdot)$.

Output: $\vec{m}$ and Y satisfying condition 1 and 2 in Assumption 4.

Algorithm $\mathcal{B}$ acts as challenger in the security game as depicted above. It will simulate Keygen and Sign such that $\mathcal{A}$ can not distinguish between simulated output and original Keygen, Sign output. $\mathcal{B}$ will use the forged signature from $\mathcal{A}$ to output $(\vec{m}, Y)$. Below are the SimKeygen and SimSign routines used by algorithm $\mathcal{B}$.

SimKeygen($\lambda$,n)

Proceed as Keygen($\lambda$, n), except choosing $\vec{x}$, $\vec{x}'$ on its own. Instead, evaluate $\iota_1'(\vec{x})$ as follows.

$$\iota_1'(\vec{x}) = \vec{x}u$$
$$= \vec{x}(u_2 + (O, \mathcal{P}_1))$$
$$= \vec{x}(t_1 u_1 + (O, \mathcal{P}_1))$$
$$= \vec{x}(t_1(\mathcal{P}_1, \alpha_1, \mathcal{P}_1) + (O, \mathcal{P}_1))$$
$$= \vec{x}\mathcal{P}_1(t_1, (\alpha_1 t_1 + 1)).$$

Hence public key pk=(gk, $\vec{u}$, $\vec{v}$, $\vec{c}$) can be output (with gk=(e, $G_1$, $G_2$, $G_T$, $\mathcal{P}_1$, $\mathcal{P}_2$)). As a secret key, instead of ($\vec{x}$, $\vec{r}$) there is ($\vec{x}\mathcal{P}_1$, $\vec{r}$).

SimSign($id, \vec{m}=(m_1, \ldots, m_n)^T$)

As $\vec{x}$ is not known, Y cannot really be solved. However, the oracle can, e.g., querying $\mathcal{O}^{\vec{x},y_2}(id, \vec{m})$ gets back the required Y. Afterwards, use the Sign procedure to generate a valid signature.

If $\mathcal{A}$ returns a valid forgery, from the commitment d of Y may be extracted using trapdoor $\alpha_2$ and break Assumption 4.

As can be seen, there is described homomorphic network signature schemes, provably secure in standard model. The schemes are probabilistic and based on prime order bilinear pairings. One scheme is based on a natural homomorphic hardness assumption on bilinear pairing groups. A second scheme which is secure in a stronger security model, with security reduced to an oracle-based hardness assumption. Note that these schemes do not need a CompatibilityCheck procedure.

EXAMPLE OPERATING ENVIRONMENT

Figure 4:
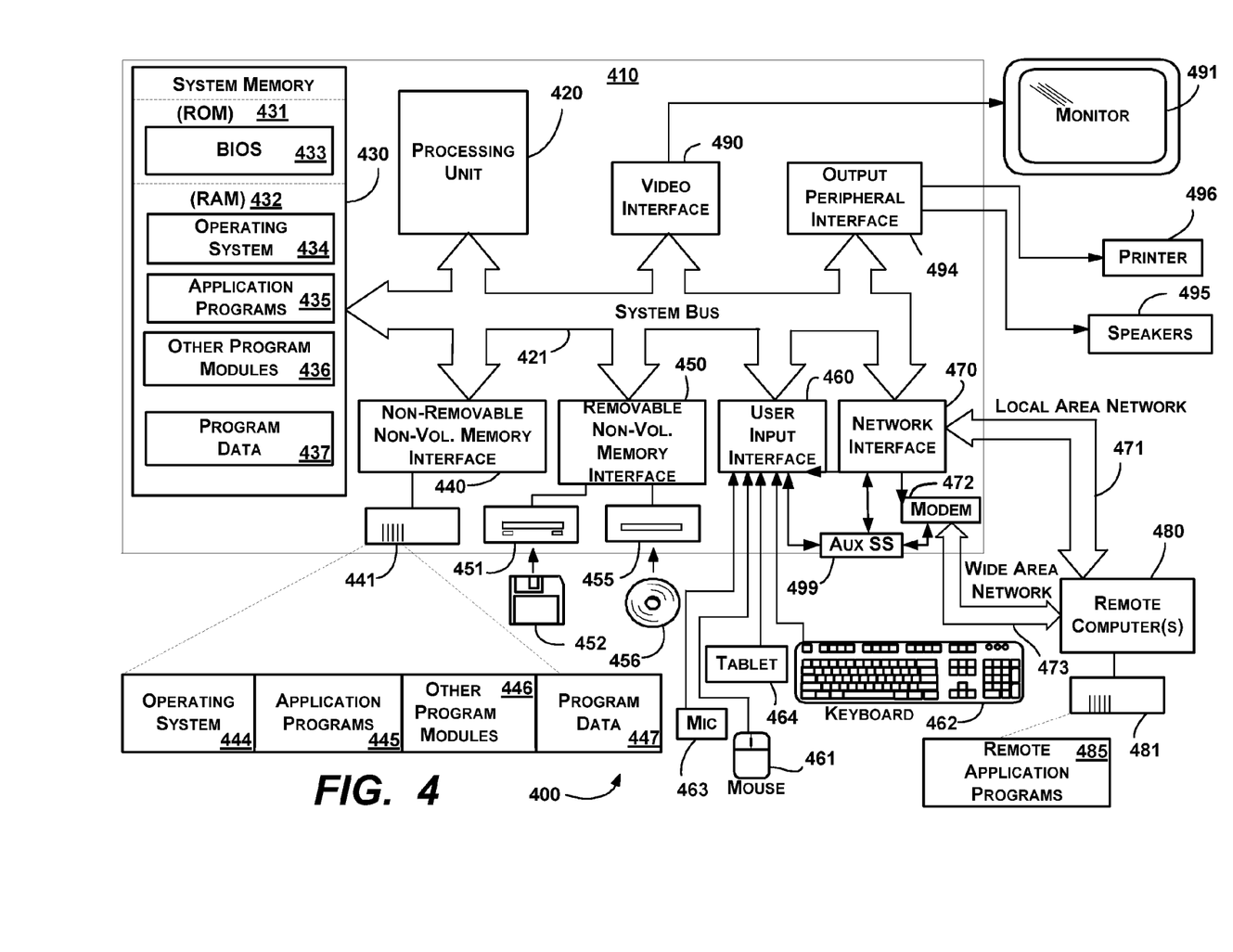
FIG. 4 is a block diagram representing an example computing environment into which aspects of the subject matter described herein may be incorporated.

FIG. 4 illustrates an example of a suitable computing and networking environment 400 into which the examples and implementations of any of FIGS. 1-3 may be implemented, for example. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the example operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an example system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are examples and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor comprising:
   signing a set of data using an homomorphic signature scheme, in which the homomorphic signature scheme is based upon bilinear pairing with standard prime order groups, the homomorphic signature scheme secure in a standard model that has no dependency on random oracle without requiring a special composite order pairing group; and
   providing public information useable for authenticating the signed set of data.

2. The method of claim 1 wherein signing the sets of data comprises dividing a block of data into smaller blocks, and separately signing each smaller block.

3. The method of claim 2 wherein distributing the data comprises sending the smaller blocks to nodes of a network topology configured for network coding combinations of a subset of the smaller blocks.

4. The method of claim 1, wherein the bilinear pairing with standard prime order groups comprises prime numbers and points on an elliptic curve used to sign the data.

5. The method of claim 1, wherein using the signed set of data for further processing comprises transmitting the signed set of data to an intermediary node to use the set of data for further processing prior to transmitting the signed set of data to a final destination node.

6. The method of claim 5, further comprising combining the signed set of data with at least one other set of data in a network coding scheme into a combined set of data, sign the combined set of data using the homomorphic signature scheme and additional public information, and transmit the combined, signed set of data using a distribution scheme and the additional public information to the final destination node.

7. A computing device comprising:
   a processor; and
   a memory coupled to the processor, the memory comprising computer-program instructions executable by the processor, the instructions configured to:
      receive public information with a set of data from a node within a network topology, the set of data being digitally signed using a homomorphic signature scheme based upon bilinear pairing with standard prime order groups, the public information enabling authentication of the digitally signed set of data, the homomorphic signature scheme secure in a standard model that has no dependency on random oracle without requiring a special composite order pairing group; and
      authenticate the digitally signed set of data using the public information and
      proof data including parameters for verification in a Groth-Sahai proof system.

8. The computing device of claim 7 wherein the instructions are further configured to discard the set of data if not verified.

9. The computing device of claim 7 wherein the instructions to use the set of data for further processing comprise instructions that when executed combine the set of data with at least one other set of data in a network coding scheme into a combined set of data, sign the combined set of data using the homomorphic signature scheme, and transmit the combined, signed set of data using a distribution scheme.

10. The computing device of claim 9, wherein the distribution scheme comprises a network coding content distribution scheme.

11. The computing device of claim 9 wherein the bilinear pairing with standard prime order groups comprises prime numbers and points on an elliptic curve used to sign the data.

12. The computing device of claim 7 wherein the instructions to use the set of data for further processing comprise instructions that when executed decode the set of data and at least one other set of data into decoded sets of data, and reassemble the decoded sets of data into an original data block.

13. The computing device of claim 7, wherein the processor is further programmed to, upon determining that the digitally signed set of data is authentic, decode and reassemble the set of data in original data blocks.

14. A computer-readable storage memory having executable instructions which, when processed by a computer, cause the computer to perform operations comprising:
   receiving public information along with a signed set of data from a node in a network topology, the set of data signed using a homomorphic signature scheme based upon bilinear pairing with standard prime order groups, the public information enabling an authentication of the digitally signed data, the homomorphic signature scheme secure in a standard model that has no dependency on random oracle without requiring a special composite order pairing group;

verifying whether the digitally signed set of data is authenticated using the public information and proof data including parameters for verification in a Groth-Sahai proof system; and upon determining that the digitally signed set of data is authenticated:
  combining the set of data with at least one other set of data in a network coding scheme into a combined set of data;
  signing the combined set of data using the homomorphic signature scheme; and
  transmitting the combined set of data to a second node in the network topology using a distribution scheme for further processing.

15. The computer-readable storage memory of claim 14 having further executable instructions comprising providing proof data independent of a random oracle.

16. The computer-readable storage memory of claim 14, wherein transmitting the combined, signed set of data further comprises transmitting the combined, signed set of data to an intermediary node to use the set of data for further processing prior to transmitting the combined, signed set of data to a final destination node.

17. The computer-readable storage memory of claim 16, wherein the instructions to use the set of data for further processing comprise instructions that when executed combine the set of data with at least one other set of data in a network coding scheme into a combined set of data, sign the combined set of data using the homomorphic signature scheme, and transmit the combined, signed set of data using a distribution scheme to the final destination node.

18. The computer-readable storage memory of claim 17, wherein the distribution scheme comprises a network coding content distribution scheme.

19. The computer-readable storage memory of claim 14 wherein the bilinear pairing with standard prime order groups comprises prime numbers and points on an elliptic curve used to sign the data.

20. The computer-readable storage memory of claim 14, wherein the digitally signed set of data comprises a plurality of signed blocks of data.

* * * * *